April 2, 1963  E. C. RHYNE, JR  3,084,322
POWER RECTIFYING APPARATUS
Filed May 2, 1960
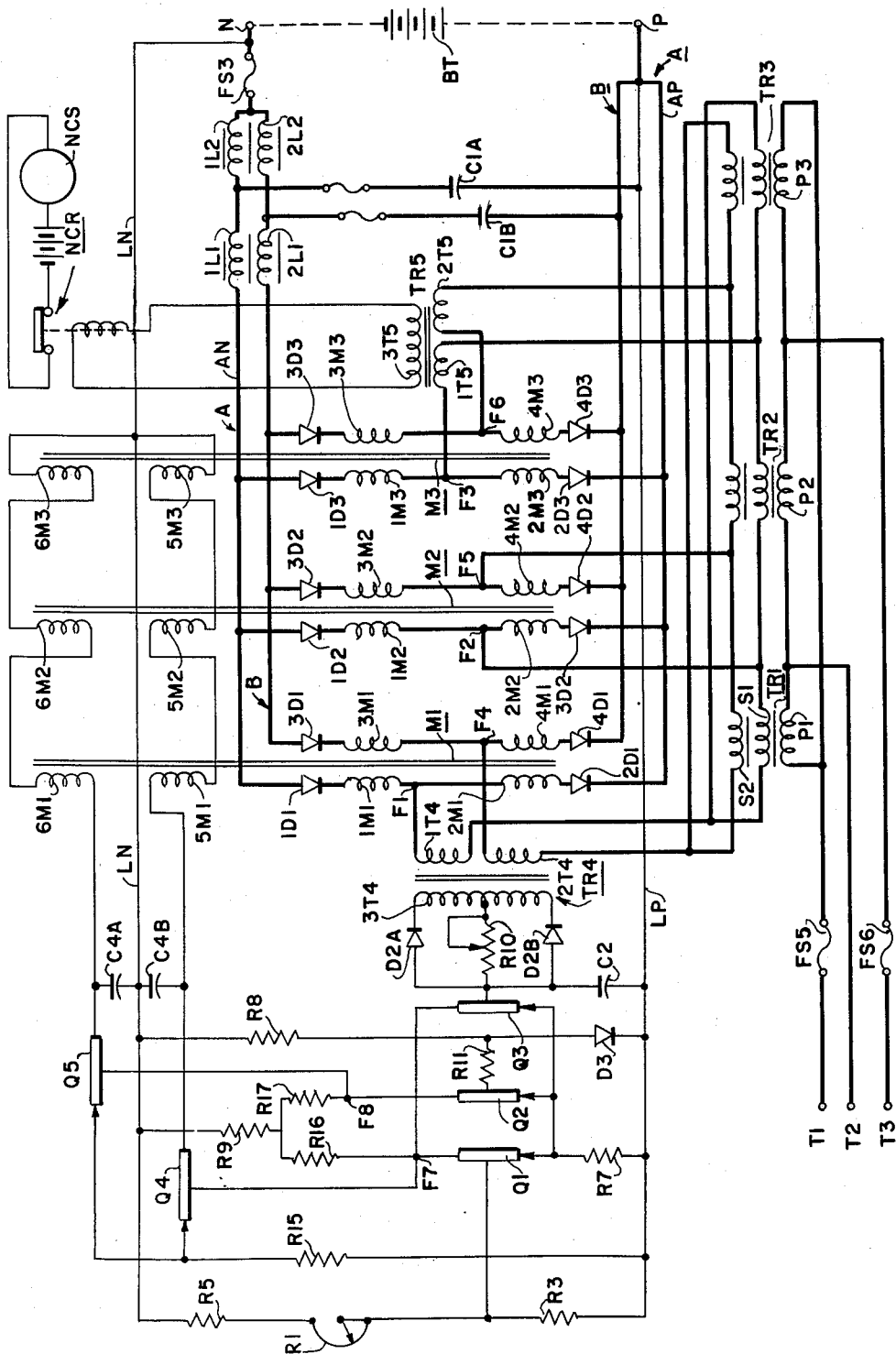

United States Patent Office 3,084,322
Patented Apr. 2, 1963

3,084,322
POWER RECTIFYING APPARATUS
Earl C. Rhyne, Jr., East Pepperell, Mass., assignor to The Warren Manufacturing Company, Inc., Littleton, Mass., a corporation of Massachusetts
Filed May 2, 1960, Ser. No. 26,240
15 Claims. (Cl. 321—27)

My invention relates to power rectifying apparatus for converting alternating current to direct current with the aid of silicon power rectifiers or similar semiconductor units individually connected in series with a controllable saturable reactor for controlling or regulating the voltage or amperage of the rectified power output.

In three-phase or other multi-phase rectifying apparatus of this general type, the semiconductor units, each in series with a saturable reactor winding, are connected in a bridge network whose feeder points receive alternating current and whose output points supply full-wave rectified current to the output terminals or buses of the apparatus.

The current-carrying capacity of the semiconductor rectifier units, including the largest available silicon power diodes, is limited. It is necessary, therefore, to connect two or more such semiconductor rectifiers parallel to each other in each leg of the bridge network if the rectifying apparatus is called upon to furnish an output current in excess of that which can be passed through a single rectifier diode in each of the network legs. For example, a commercially available rectifying apparatus for battery-charging purposes, furnishing an output of 200 amperes at 48 volts, requires two large rectifier diodes in parallel per leg. A three-phase rectifier apparatus of this type thus requires a total of 12 such diode units. In another available rectifier for battery-charging purposes, operating with a rectified power output of 400 amperes at 48 volts, a total of 24 silicon power-rectifier diodes of the largest available size are required, four diodes being parallel connected in each leg of the rectifier bridge network.

Some of the problems encountered in the manufacture, operation and maintenance of semiconductor rectifying apparatus of this type are as follows:

In a multi-phase rectifier bridge network of semiconductor diodes, the occurrence of a defect in one diode, causing a short-circuiting of that diode, tends to also cause destruction of the other two diodes of the same polarity. In large current-rectifying equipment, this presents a difficult problem which most manufacturers have resolved by inserting fuses in series with the respective semiconductor diodes. For a high-current rectifier, for example of 400 amperes capacity where 24 diodes are needed, this use of just as many fuses creates a formidable mechanical problem. The wiring of the circuits in which the fuses are located must be rated for a relatively high current to begin with, and the fuses for such high amperage, as well as the associated fuse clips and other hardware items, are expensive and are extremely large in comparison with the relatively small size of the rectifier diodes to be protected.

Another problem pertains directly to the paralleling of two or more diodes for obtaining the required high current capacity of the apparatus. If parallel diodes in one and the same leg of a bridge network are to operate properly, the internal voltage drops of all of these diodes must be essentially the same. Otherwise the diode with the lowest internal voltage drop would tend to carry all of the load and therefore would burn and short out. To cope with this problem, the parallel diodes in each leg must be matched. For the above-mentioned 400 ampere rectifying apparatus, this would require a matched set of four diodes per leg in the three-phase full-wave bridge circuit. The use of so many matched sets of diodes is unsatisfactory. In the first place, the cost of matched diodes is considerably greater than the cost of a similar set of unmatched diodes. Another objection is the fact that when one diode shorts during operation, the maintenance man replacing it is often reluctant to replace the entire set of matched power diodes, especially since they are expensive. The substitution of an unmatched diode for a defective diode, however, impairs the reliability of the rectifying apparatus, as mentioned above.

Still another serious problem relating to rectifying equipment for power current, such as for 400 amperes output, concerns the wiring techniques required for interconnecting the power-circuit components. Since all of these circuits are rated for very high current, the normal procedure is to connect them together by means of bus bars. The use of bus bars in rather complicated circuitry of this type requires a great amount of machine shop work and the total wiring job is correspondingly expensive.

It is an object of my invention to devise rectifying apparatus generally of the above-described type that solve all of the above-mentioned problems. In other words, my invention aims at providing a bridge-type full-wave rectifier apparatus for high current output, operating with semiconductor rectifier units in series with saturable reactors, that does not require matching of the semiconductor diodes or equivalent semiconductor units per phase of the multi-phase current supply, but that nevertheless secures the predetermined, preferably equal, load-sharing of all semiconductor units operating in parallel relation, and also affords, without detriment to reliability of operation, a considerable reduction in the number of fuses or other overload-responsive cutouts required, thus resulting in a considerable simplification of the equipment as well as in a corresponding reduction of its space requirements.

To achieve these objects, and in accordance with my invention, I connect only one semiconductor unit, such as a silicon power diode, in each leg of a full-wave rectifier bridge network and obtain the desired high power output, exceeding the current capacity of an individual diode, by connecting two or more such networks in parallel relation to each other between the direct-current output terminals or buses of the apparatus, the connection being such that the individual bridge networks— each being individually complete in including a power input transformer winding, a bridge group of diodes and reactors, as well as the filtering components needed for smoothing the rectified output—are electrically insulated from each other between the respective circuit points where they all reach the common connections to the two output terminals; but I interlink these component rectifier networks inducitively by means of their respective power input transformer windings, their saturable reactors, their inductive filter components and any other inductive devices as may be used in these networks.

These and further features of my invention will be more fully described presently with reference to the embodiment of a three-phase rectifying apparatus illustrated by way of example on the accompanying drawing.

The rectifying apparatus illustrated serves to charge a battery BT from a source of alternating power current by regulated charging voltage.

For disclosing a complete rectifier equipment suitable for the just-mentioned purpose, the illustration shows not only the rectifying apparatus according to the invention proper but also those control and regulating components that constitute incidental environment. For distinction, however, the rectifying apparatus proper is shown by heavier lines than the accessory components and circuits.

The alternating feeder current is supplied to the line terminals T1, T2, T3 of a three-phase transformer assembly which, in the illustrated example, comprises three analogous transformer units TR1, TR2 and TR3 having respective primary windings P1, P2, P3 in delta connection with each other. Each of transformer units TR1, TR2, TR3 has its own magnetizable core. The core of transformer TR1 is provided with two secondary windings S1 and S2 which have the same number of turns and the same electric characteristics. These windings are preferably wound at the same time onto the core from the same conductor material, one along the other. The transformer units TR2 and TR3 are equipped with respective pairs of secondary windings electrically corresponding to those of transformer unit TR1.

To provide for the required total current carrying capacity, in excess of that of an individual semiconductor diode, the apparatus is shown equipped with two three-phase bridge networks denoted as a whole by A and B respectively, both extending between the negative and positive output terminals N and P to which the load BT is connected. It will be understood that, if necessary, three or more such individual bridge networks of rectifiers may be connected in parallel relation to each other across the output terminals, all of these networks being electrically insulated from each other but inductively interlinked in the manner described below with reference to the two networks A and B illustrated.

The secondary winding S1 of the power-input transformer unit TR1 and the corresponding two secondaries of transformer units TR2 and TR3 are three-phase connected to the feeder points F1, F2, F3 of the rectifier bridge network A. The secondary winding S2 and the corresponding two other power-input secondaries are connected in the same manner to the feeder points F4, F5, F6 of the bridge network B. Hence, each network is electrically energized from the power supply in electrically insulated relation to the other.

Considering first the bridge network A by itself, it will be noted that it is associated with three magnetic amplifiers which comprise three pairs of alternating-current windings 1M1 and 2M1, 1M2 and 2M2, 1M3 and 2M3 of three respective saturable reactors M1, M2 and M3, each of these windings being connected in series with one of six respective diodes 1D1 and 2D1, 1D2 and 2D2, 1D3 and 2D3, consisting of silicon power rectifiers. The rectified output of bridge network A is fed through a filter choke coil 1L1 into a capacitor bank C1A which, in combination with coil 1L1 and another choke coil 1L2, forms a smoothing filter through which the rectified output voltage is impressed across the output terminals N and P.

The parallel connected bridge network B is designed in the same manner and associated with the same three magnetic amplifiers as the network A. The network B thus comprises three pairs of alternating current windings 3M1 and 4M1 which are inductively interlinked with respective windings 1M1 and 2M1 by the saturable core of reactor M1. Analogously, the network B has a second set of alternating current windings 3M2 and 4M2 inductively linked with windings 1M2 and 2M2 respectively of saturable reactor M2, and a third set of alternating-current windings 3M3 and 4M3 inductively interlinked with windings 1M3 and 2M3 respectively of saturable reactor M3. The rectified output of network B passes through a choke coil 2L1 into a bank of capacitors C1B which, in combination with coil 2L1 and another choke coil 2L2, forms a smoothing filter through which the rectified voltage is impressed across the output terminals N and P.

As will be explained below, the output voltages of networks A and B are regulated to be equal and constant, so that the respective currents passing through these networks are additively supplied through the output terminals N and P to the load here represented by the battery BT. For the purpose of the above-mentioned voltage or current regulation, a signal must be provided in dependence upon a give operating condition of the rectifying apparatus. For this purpose, the illustrated apparatus comprises a current transformer TR4 which has two primary windings 1T4 and 2T4 acting upon a single midtapped secondary winding 3T4. The two primary windings 1T4 and 2T4 are electrically equal and are connected between the power-input secondaries and the respective feeder points F1 and F4 of bridge networks B and A.

The illustrated apparatus is further equipped with a supervisory relay device which in this particular case serves to issue an alarm if the rectifying apparatus operates under no-load conditions. For operating the relay device, another transformer TR5 is provided. This transformer, in analogy to transformer TR2, has two primary windings 1T5 and 2T5 operating on a single secondary winding 3T5. The primary windings 1T5 and 2T5 are serially connected between the power input secondaries and the respective feeder points F3 and F6 of networks A and B.

While the particular design and functioning of the transformers TR4 and TR5 will be more fully described in a later place, it is significant with respect to the rectifying apparatus proper that the two primary windings 1T4, 2T4 of transformer 2R4 are electrically similar and inductively interlinked, and that this also applies to the two primaries 1T5 and 2T5 of transformer TR5. The two choke coils 1L1 and 2L1 have a magnetizable core in common so that they are likewise inductively interlinked, and they are also identical in electrical respects. The same applies to the two choke coils 1L2 and 2L2, both wound upon a common magnetizable core and having the same electric characteristics.

It will be understood from the foregoing that each of the two bridge networks A and B constitutes a three-phase full-wave rectifier complete with magnetic amplifier, current transformer TR2 for a regulating signal, current transformer TR5 for supervisory purposes, and also complete with respect to the appertaining power transformer windings and with respect to the choke coil and capacitor circuits. The two individually complete networks have no electrical connection with each other until they reach the point of common connection to a fuse FS3 or other overload-responsive cutout ahead of the negative output terminal N on the one hand, and until they reach the common point of connection with the positive output terminal P on the other hand.

Since the two networks A and B share the same magnetizable cores on all of the magnetic components, the ampere turns of the secondary winding S1 on power transformer unit TR1 tend to be equal the ampere turns of the secondary winding S2 on the same transformer unit. Such tendency also exists with respect to the power input transformer units TR2 and TR3, the magnetic amplifier windings 1M1 and 3M1, 2M1 and 4M1, 1M2 and 3M2, 2M2 and 4M2, 1M3 and 3M3, 2M3 and 4M3. The same applies to the choke coil windings 1L1 and 2L1, and to the choke coil windings 1L2 and 2L2.

This tendency toward equality of ampere turns on all magnetizable cores of the two parallel networks causes the respective currents flowing through the networks and their individual legs to be substantially equal, and also causes the currents through the associated rectifier diodes to be substantially equal.

Furthermore, the total current rating of the network A is one-half the current rating required to supply the direct-current load at output terminals N and T, and is also equal to the current rating of the bridge network B. In other words, the networks A and B are of identical current rating and equally share the total direct-current load delivered to the common output terminals N, P.

The above-described apparatus is suitable for example to furnish a direct-current output of 200 amperes at 48 volts. For supplying an output of the same voltage but of 400 amperes, four completely insulated component networks, A and B, are to be used. Since all such paralleled networks divide the load equally, the size of the wiring required for the individual circuits has a proportionately smaller current rating. In practice, for the 400 ampere rectifier apparatus, the circuitry can thus be wired by means of four identical harnesses made on harness boards, by fairly unskilled labor. The diodes do not have to be matched. A short-circuit in any one diode affects the current only in the circuit legs with which it is associated but does not endanger the other circuits. A short-circuit in one diode is prevented from causing a number of other diodes to also become short-circuited by the provision of fuses or other overload-responsive cut-outs FS5, FS6 which are common to all component rectifier networks and are adequate to protect from such mutliple short-circuits. It may be added that the production of such rectifying apparatus does not appreciably complicate the fabrication of the magnetic components because, conventionally, these are already wound from two or more rectangular copper strips, for example 0.380 x 0.150 inch, in order to take care of the high current loading required for example in a 200 ampere rectifier. For a still larger rectifying apparatus, such as for 400 amperes, the magnetic components can readily be wired with four rectangular copper strips placed in parallel.

While the foregoing essentially completes the description of the illustrated rectifying apparatus as far as the invention proper is concerned, a brief description will now be given of the associated components serving to provide for voltage and current-limit regulation of the rectified output voltage. For a more detailed description and explanation of these other components and their functioning reference may be had to my copending application Serial No. 849,050, filed October 27, 1959, and assigned to the assignee of the present invention.

The core of the saturable reactor M1 is provided with two direct-current control windings 5M1, 6M1. Reactors M2 and M3 have corresponding windings 5M2, 6M2 and 5M3, 6M3. The three control windings 5M1, 5M2 and 5M3 are connected in a first direct-current control circuit in which the direction of current flow is such as to de-saturate the magnetic amplifiers, thus tending to lower the rectifier output voltage. The windings 6M1, 6M2, 6M3 are connected in a second direct-current control circuit so traversed by current that the latter windings, when excited, tend to increase the saturation of the magnetic amplifiers for increasing the rectifier output voltage. Capacitors C4A and C4B are connected across the respective groups of control windings to provide protection from large voltages appearing on the collector circuits of the control transistors described below.

The regulatory portion of the system is excited by the rectifier output voltage taken from terminals N, P through respective leads LN and LP. The supply of excitation voltage from leads LN and LP to the direct-current control windings of the magnetic amplifier is controlled by a two-stage auxiliary amplifier formed by a cascade-type connection of two constant-sum current networks.

One of the sum current networks, forming the first stage of the auxiliary amplifier, is composed of two matched transistors Q1, Q2 and two balanced resistors R16, R17 in series with the respective transistors. The two transistors have a common emitter resistor R7 connected to the positive lead LP. Resistors R16 and R17 are connected through a resistor R9 with the negative lead LN. The network tends to maintain the sum of the two collector currents of respective transistors Q1 and Q2 at a constant value equal to the current flowing through the common emitter resistor R7.

The base of transistor Q2 is connected through a resistor R11 to a source of constant datum voltage consisting of a Zener silicon diode D3 in series with a resistor R8 between leads LP and LN. Diode D3 and resistor R8 form a voltage divider in which the voltage drop across the Zener diode is kept constant, for example at ten volts for a rectifier output voltage of 48 volts.

The base of transistor Q1 is connected to another voltage divider which comprises resistors R3 and R5 as well as a control rheostat R1, all connected in series between bus leads LN and LP. When the rectified output voltage tends to vary, the bias potential at the base of transistor Q1 tends to vary accordingly.

Under normal, balanced conditions of the sum-current network, the collector currents flowing through the respective transistors Q1 and Q2 as well as through respective resistors R16 and R17, are equal, each being one-half of the current flowing through the common emitter resistor R7. When the rectifier output voltage becomes excessive, the voltage across resistor R3 increases above the datum voltage of 10 volts and the base of transistor Q1 is made more negative relative to the emitter, while the base of transistor Q2 becomes more positive. This makes transistor Q1 more conductive and transistor Q2 less conductive, causing more current to flow through the collector circuit of transistor Q1 and resistor R16, and less current to flow through the collector circuit of transistor Q2 and resistor R17, the sum of the two currents being still constant but the respective shares being now unbalanced. As a result, an amplified output voltage of one or the other polarity appears between the normally equipotential output points F7 and F8 of the Q1—Q2 sum current network.

This output voltage controls the transistors Q4 and Q5 of the second sum current network. One branch of the second network comprises the reactor control windings 5M1, 5M2, 5M3 in the collector circuit of transistor Q4. The second branch comprises the control windings 6M1, 6M2, 6M3 in the collector circuit of transistor Q5. Both branches extend parallel to each other from the positive lead LP to an emitter resistor R15 common to transistors Q4, Q5 and connected to the positive lead LP. The transistors Q4 and Q5 are matched, and the functioning of the Q4—Q5 network is such as to maintain a constant sum current, determined by the current flowing through the common emitter resistor R15.

When the system is in equilibrium, one-half of the current flowing through resistor R15 passes through the collector of transistor Q4, and one-half through the collector of transistor Q5. When the rectifier output voltage is somewhat too high, such that the base potential of transistor Q1 increases above the equilibrium value, transistor Q1 is turned on more than transistor Q2, causing more current to flow through resistor R16 than through resistor R17. This lowers the base potential of transistor Q5 and raises the base potential of transistor Q4. As a result, transistor Q4 is turned on more and transistor Q5 is turned off to a corresponding extent so that more current will now flow through transistor Q4 than through transistor Q5. Accordingly, more current is now flowing through the magnetic-amplifier control windings 5M1, 5M2, 5M3 than through the control windings 6M1, 6M2, 6M3. The resulting regulatory effect tends to decrease the rectifier output voltage to the accurate value. When the rectifier output voltage is somewhat too low, the reverse regulatory action takes place.

In order to prevent the above-described voltage regulation from becoming inaccurate due to temperature-responsive changes in resistance of the transistors Q1 and Q2, a compensating resistor R11 is interposed between the base of transistor Q2 and the Zener diode D3. The resistor R11 is so dimensioned that the sum of the dynamic resistance of diode D3 plus the resistance of R11 is essentially equal to the resistance of R3. As a result, any change in internal resistance of the transistors becomes negligible relative to the self-regulating performance of the apparatus.

Another transistor Q3 is connected parallel to the one transistor Q1 that is driven by the variable control voltage depending upon the output voltage of the apparatus. The transistor Q3 is normally biased to cut-off so as to remain non-conductive during normal operation. Consequently, the presence of the parallel transistor Q3 does not interfere with the above-described voltage regulating performance of transistors Q1, Q2, Q4, Q5. However, the transistor Q3 is controlled in response to the current transferred by the power rectifier to impose upon the regulating system an overriding current-limit control in the event the load imposed upon the power rectifier exceeds a predetermined value. For this purpose, an adjustable resistor R10 has one end connected to the mid-tap of the secondary winding 3T4 of current transformer TR4. The other end of resistor R10 is connected to the base of transistor Q3 and is also connected with the two end points of the secondary winding 3T4 through respective diodes D2A and D2B consisting of solid-state rectifiers. The voltage in the secondary winding 3T4 is proportional to the direct load current supplied by the rectifying apparatus. The secondary 3T4, the resistor R10 and the diodes D2A, D2B form together a center-tapped rectifier network whose rectified output voltage appears across the active portion of resistor R10 and is filtered by means of a capacitor C2. The direct-current voltage across resistor R10 is proportional to the direct current drawn from the rectifier apparatus.

Since the transistor Q1 is connected in the regulating circuit but has a higher base potential, i.e. a less positive potential, than the transistor Q3, the transistor Q3 remains cut off and is substantially inoperative in the regulating circuit under normal operating conditions. Hence the rectifier apparatus is normally regulated for constant voltage. However, if the apparatus reaches a state where the voltage across resistor R10 is just slightly larger than the voltage across resistor R3, the transistor Q3 assumes control of the regulating network and makes the transistor Q1 inoperative. That is, at this point the transistor Q1 is biased to cut-off, and the transistor Q3 cooperates with transistor Q2 to effect an overriding control for limiting the rectified output current to a given constant value.

As mentioned, the illustrated apparatus comprises a current transformer TR5 whose primary windings 1T5, 2T5 are connected in series between the secondary windings of the power input transformer and the respective power rectifier networks. The secondary winding 3T5 of the current transformer is connected to an alternating-current relay NCR which controls a device NCS for signalling a faulty condition or initiating a suitable control operation as may be desired. The relay NCR will respond to any such conditions as loss of alternating voltage or excessive reduction of that voltage, blowing of fuses in the direct-current output circuit or in component control circuits, tripping of a breaker or contactor in the alternating-curent feeder circuit, or any other condition resulting in inadequate charging or resulting in discharging of the battery. The trip value of current for relay NCR is readily adjustable, for example between plus 3% to minus 1% simply by adjusting the force of the return spring in the relay.

For securing this performance, the core of current transformer TR5 consists of a square-loop material, and the ampere turns of the primaries 1T5, 2T5 are such that the core material abruptly saturates at a very small value of current compared with the full-load value, such as about 1% of the rated full-load alternating current. Such saturation at a very low percentage of current prevents a large alternating voltage from appearing across the primaries 1T5, 2T5 at full load, and also prevents large secondary voltages from being imposed at full load on the no-charge relay NCR.

When the apparatus in inactive, the contact of relay NCR is closed, but the relay picks up at an extremely small current value and remains normally picked up as long as the apparatus is in operative condition. Failure of the apparatus, which is to result in relay NCR dropping out, will be indicated by the fact that the alternating current through the primary winding 1T5 drops below the above-mentioned slight limit value of saturation.

It will be understood that the particular design of the magnetic amplifiers used as a controllable static state power rectifier in the illustrated apparatus is not essential to the invention proper and may be modified or substituted by other magnetic amplifier networks in conventional manner. It will also be obvious to those skilled in the art, upon studying this disclosure, that my invention permits of various other modifications with respect to circuit components and circuitry, and hence may be embodied in apparatus other than particularly described herein, without departing from the essential features of my invention and within the scope of the claims annexed hereto.

I claim:

1. A controllable power-rectifying apparatus, comprising a multiphase power-input transformer having a primary circuit for connection to an alternating-current power source and having for each phase a group of mutually insulated and inductively interlinked secondary windings; two direct-current output terminals; a plurality of multiphase rectifier bridge networks each having alternating current feeder points in multiphase connection with one of said respective secondary windings in each of said winding groups, each of said networks having a controllable saturable reactor and a semiconductor rectifier unit connected in series with each other between each feeder point and each of said output terminals, those of said reactors that are disposed in different respective networks but are connected to respective secondary windings of the same winding group being inductively interlinked and constructed to adjust forward voltage drop on their corresponding rectifier units until forward currents of each of said rectifier units are substantially of a predetermined proportion regardless of their forward voltage characteristics; each of said rectifier networks being electrically insulated throughout from each of the other networks with the exception of their common connection to said output terminals, whereby all said networks and rectifier units are constrained to share the load of the rectifying apparatus in a given proportion.

2. In power-rectifying apparatus according to claim 1, said inductively interlinked secondary windings having an iron core in common and having the same number of turns, and said inductively interlinked reactors having an iron core in common and having the same number of winding turns among themselves, whereby all said rectifier networks equally share the load of the apparatus.

3. A controllable power-rectifying apparatus, comprising a multiphase power-input transformer having a primary circuit for connection to an alternating-current power source and having for each phase a group of mutually insulated and inductively interlinked secondary windings which all have the same number of ampere turns; two direct-current output terminals; a plurality of multiphase rectifier bridge networks each having alternating current feeder points in multiphase connection with one of said respective secondary windings in each of said winding groups, each of said networks having a controllable saturable reactor and a semiconductor diode connected in series with each other between each feeder point and each of said output terminals, those of said reactors that are disposed in different respective networks but are connected to respective secondary windings of the same winding group being inductively interlinked and having the same number of ampere turns among themselves and constructed to adjust forward voltage drop on their corresponding rectifier units until forward currents of each of said rectifier units are substantially of a predetermined proportion regardless of their forward voltage characteristics; saturation control means connected with all of said reactors for controlling the rectifier output and comprising a current transformer having a secondary circuit for providing a control signal for said control means, said current transformer having a plurality of primary windings inductively interlinked and of the same number of ampere turns among themselves, each of said primary windings being serially interposed between one of said feeder points and one of said respective secondary-winding group of said power-input transformer.

4. A power-rectifying apparatus according to claim 1, comprising supervisory relay means responsive to the load condition of the apparatus, said relay means having a relay-operating transformer with a plurality of primary windings of the same number of ampere turns, each of said latter primary windings being serially connected between another feeder point of one of said respective rectifier networks and one of said respective secondary-winding group of said power-input transformer.

5. A power-rectifying apparatus according to claim 1, comprising overload-responsive cut-out means connected in series between at least one of said two output terminals on the one hand and the totality of said rectifier networks inclusive of said choke coils on the other hand so as to be series-connected to each of said semiconductor diodes while being disposed extraneously of all of said rectifier networks taken individually, said individual networks being bare of any further overload-responsive cut-out means.

6. A controllable power-rectifying apparatus, comprising a multiphase power-input transformer having a primary circuit for connection to an alternating-current power source and having for each phase a group of mutually insulated and inductively interlinked secondary windings; two direct-current output terminals; a plurality of multiphase rectifier bridge networks each having alternating current feeder points in multiphase connection with one of said respective secondary windings in each of said winding groups, each of said networks having a controllable saturable reactor and a semiconductor rectifier unit connected in series with each other between each feeder point and each of said output terminals, those of said reactors that are disposed in different respective networks but are connected to respective secondary windings of the same winding group being inductively interlinked and constructed to adjust forward voltage drop on their corresponding rectifier units until forward currents of each of said rectifier units are substantially of a predetermined proportion regardless of their forward voltage characteristics; each of said rectifier networks comprising output filter means separate from the filter means of each other network and having a choke coil serially interposed between the network and one of said output terminals, said choke coils being inductively interlinked, each of said rectifier networks inclusive of its filter means being electrically insultaed throughout from each of the other networks with the exception of their common connection to said output terminals, whereby all said networks and rectifier units are constrained to share the load of the rectifying apparatus in a given proportion.

7. In power-rectifying apparatus according to claim 6, said inductively interlinked secondary windings having an iron core in common and having the same number of turns, said inductively interlinked reactors having an iron core in common and having the same number of winding turns among themselves, and said choke coils having an iron core in common and having the same number of turns amoung themselves, whereby all said rectifier networks equally share the load of the apparatus.

8. A controllable power-rectifying apparatus, comprising a multiphase power-input transformer having a primary circuit for connection to an alternating-current power source and having for each phase a group of mutually insulated and inductively interlinked secondary windings which all have the same number of ampere turns; two direct-current output terminals; a plurality of multiphase rectifier bridge networks each having alternating current feeder points in multiphase connection with one of said respective secondary windings in each of said winding groups, each of said networks having a controllable saturable reactor and a semiconductor diode connected in series with each other between each feeder point and each of said output terminals, those of said reactors that are disposed in different respective networks but are connected to respective secondary windings of the same winding group being inductively interlinked and having the same number of ampere turns among themselves and constructed to adjust forward voltage drop on their corresponding rectifier units until forward currents of each of said rectifier units are substantially of a predetermined proportion regardless of their forward voltage characteristics; filter choke coils serially interposed between said respective networks and one of said terminals, said coils being inductively interlinked and having the same number of ampere turns among themselves; saturation control means connected with all of said reactors for controlling the rectifier output and comprising a current transformer having a secondary circuit for providing a control signal for said control means, said current transformer having a plurality of primary windings inductively interlinked and of the same number of ampere turns among themselves, each of said primary windings being serially interposed between one of said feeder points and one of said respective secondary-winding group of said power-input transformer.

9. A controllable power rectifying apparatus comprising an alternating current power source, two direct current output terminals, a plurality of parallel connected rectifiers between said source and one of said terminals, mutually insulated and inductively interlinked saturable reactor means connected in series with each of said rectifiers, and separate output filter means for each rectifier having a choke coil serially interposed between each rectifier and one of said output terminals, said choke coils being inductively interlinked.

10. A controllable power rectifying apparatus comprising an alternating current power source, two direct current output terminals, a plurality of parallel connected rectifiers between said source and one of said terminals, mutually insulated and inductively interlinked saturable reactor means connected in series with each of said rectifiers, and separate output filter means for each rectifier having a choke coil serially interposed between each rectifier and one of said output terminals and having a capacitor connected from said choke coil to the other terminal, said choke coils being inductively interlinked.

11. A controllable power rectifying apparatus comprising an alternating current power source, two direct current output terminals, a plurality of parallel connected rectifiers between said source and one of said terminals, mutually insulated and inductively interlinked saturable reactor means connected in series with each of said rectifiers, and separate output filter means for each rectifier having a choke coil serially interposed between each rectifier and one of said output terminals and having a capacitor connected from the side of the choke remote from said one terminal to the other terminal said choke coils being inductively interlinked.

12. A controllable power rectifying apparatus comprising an alternating current power source, two direct current output terminals, a plurality of parallel connected rectifiers between said source and one of said terminals, mutually insulated and inductively interlinked saturable reactor means connected in series with each of said rectifiers, and separate output filter means for each rectifier having a pair of choke coils connected in series and serially interposed between each rectifier and one of said output terminals, each choke coil in one pair being inductively interlinked with the corresponding one of the other pair, each filter means having a capacitor from between the pair of choke coils to the other terminal.

13. A controllable power-rectifying apparatus comprising a power-input transformer having a primary circuit for connection to an alternating-current power source and having a group of mutually insulated and inductively interlinked secondary windings, two direct-current output terminals, a plurality of rectifier means each connecting one secondary winding with said output terminals, and separate output filter means for each rectifier means having a choke coil serially interposed between each rectifier means and one of said output terminals, said choke coils being electrically insulated from each other but being mutually and inductively interlinked.

14. A controllable power-rectifying apparatus, comprising a multiphase power-input transformer having a primary circuit for connection to an alternating-current power source and having for each phase a group of mutually insulated and inductively interlinked secondary windings; two direct-current output terminals; a plurality of multiphase rectifier bridge networks each having alternating current feeder points in multiphase connection with one of said respective secondary windings in each of said winding groups, each of said networks having a choke and a semiconductor rectifier unit connected in series with each other between each feeder point and each of said output terminals, those of said chokes that are disposed in different respective networks but are connected to respective secondary windings of the same winding group being inductively interlinked; each of said rectifier networks being electrically insulated throughout from each of the other networks with the exception of their common connection to said output terminals, whereby all said networks and rectifier units are constrained to share the load of the rectifying apparatus in a given proportion.

15. A controllable power-rectifying apparatus, comprising a multiphase power-input transformer having a primary circuit for connection to an alternating-current power source and having for each phase a group of mutually insulated and inductively interlinked secondary windings; two direct-current output terminals; a plurality of multiphase rectifier bridge networks each having alternating current feeder points in multiphase connection with one of said respective secondary windings in each of said winding groups, each of said networks having a filter choke and a controllable saturable reactor and a semiconductor rectifier unit connected in series with each other between each feeder point and each of said output terminals, those of said reactors that are disposed in different respective networks but are connected to respective secondary windings of the same winding group being inductively interlinked; those of said chokes that are disposed in different respective networks but are connected to respective secondary windings of the same winding group being inductively interlinked; each of said rectifier networks being electrically insulated throughout from each of the other networks with the exception of their common connection to said output terminals, whereby all said networks and rectifier units are constrained to share the load of the rectifying apparatus in a given proportion.

References Cited in the file of this patent

UNITED STATES PATENTS

| | | |
|---|---|---|
| 2,259,294 | Cox | Oct. 14, 1941 |
| 2,265,591 | Winograd | Dec. 9, 1941 |
| 2,289,090 | Bedford | July 7, 1942 |
| 2,331,643 | Winograd | Oct. 12, 1943 |
| 2,428,543 | Boyer | Oct. 7, 1947 |
| 2,548,579 | Bedford | Apr. 10, 1951 |
| 2,810,876 | Huge | Oct. 22, 1957 |
| 2,891,212 | Bingham | June 16, 1959 |

FOREIGN PATENTS

| | | |
|---|---|---|
| 415,282 | Italy | Oct. 4, 1946 |